(12) United States Patent
Bukovics

(10) Patent No.: US 11,182,764 B2
(45) Date of Patent: *Nov. 23, 2021

(54) PEER-TO-PEER (P2P) PERIPHERAL COMMUNICATION CONTROL

(71) Applicant: NCR Corporation, Atlanta, GA (US)

(72) Inventor: Bruce Frank Bukovics, Alpharetta, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/868,653

(22) Filed: May 7, 2020

(65) Prior Publication Data

US 2020/0265402 A1 Aug. 20, 2020

Related U.S. Application Data

(62) Division of application No. 15/662,984, filed on Jul. 28, 2017, now Pat. No. 10,650,367.

(51) Int. Cl.
*G06Q 20/20* (2012.01)
*H04L 9/32* (2006.01)
(Continued)

(52) U.S. Cl.
CPC ............ *G06Q 20/206* (2013.01); *G06F 8/65* (2013.01); *G06F 8/71* (2013.01); *G06F 9/4401* (2013.01); *G06F 9/4406* (2013.01); *G06F 13/10* (2013.01); *G06F 13/4282* (2013.01); *G06F 21/575* (2013.01); *G06F 21/82* (2013.01);
(Continued)

(58) Field of Classification Search
CPC .... G06Q 20/206; G06Q 20/20; G06Q 20/202; G06Q 20/223; G06Q 2220/00; G06F 13/10; G06F 21/82; G06F 8/65; G06F 9/4406; G06F 8/71; G06F 21/575; G06F 13/4282; G06F 9/4401; G06F 13/385; G06F 2213/0042; G06F 21/44; G06F 1/1626; G07G 1/0009; H04L 9/3231; H04L 63/0823; H04L 63/0876; H04L 67/104;
(Continued)

(56) References Cited

U.S. PATENT DOCUMENTS

| | | | |
|---|---|---|---|
| 9,853,929 B2 * | 12/2017 | Pollack | G06F 8/71 |
| 2013/0229951 A1 * | 9/2013 | Raleigh | G06Q 40/12 370/259 |
| 2016/0094502 A1 | 3/2016 | Pollack et al. | |

FOREIGN PATENT DOCUMENTS

EP 3026594 A1 10/2013

OTHER PUBLICATIONS

Anonymous"Android Open Accessory Prorocol 1.0 | Android Open Source project", Nov. 19, 2016 (Nov. 19, 2016), XP055506887, Retrieved from the Internet: URL:https://web.archive.org/web/20161119130509/https://source.android.com/devices/accessories/aoa.html.

(Continued)

*Primary Examiner* — Garcia Ade
(74) *Attorney, Agent, or Firm* — Schwegman, Lundberg & Woessner

(57) ABSTRACT

A host establishes an up-to-date, an automated, secure, and Peer-Two-Peer (PSP) communication session with a peripheral. During the communication session, the host controls serialization, prioritization, and delivery of messages being passed. Each message providing command instructions and/or information for processing between the host and the peripheral.

5 Claims, 5 Drawing Sheets

(51) Int. Cl.
- *G06F 21/57* (2013.01)
- *G06F 13/42* (2006.01)
- *G06F 9/4401* (2018.01)
- *G06F 13/10* (2006.01)
- *G06F 21/82* (2013.01)
- *G06F 8/65* (2018.01)
- *G06F 8/71* (2018.01)
- *G07G 1/00* (2006.01)
- *G06Q 20/22* (2012.01)
- *G06F 13/38* (2006.01)
- *G06F 21/44* (2013.01)
- *G06F 1/16* (2006.01)

(52) U.S. Cl.
CPC ........... *G06Q 20/20* (2013.01); *G06Q 20/202* (2013.01); *G06Q 20/223* (2013.01); *G07G 1/0009* (2013.01); *H04L 9/3231* (2013.01); *G06F 1/1626* (2013.01); *G06F 13/385* (2013.01); *G06F 21/44* (2013.01); *G06F 2213/0042* (2013.01); *G06Q 2220/00* (2013.01)

(58) Field of Classification Search
CPC ......... H04L 67/14; H04L 67/26; H04L 67/30; H04L 67/34
USPC ........................................... 708/18
See application file for complete search history.

(56) References Cited

OTHER PUBLICATIONS

EP Search Report.

* cited by examiner

PEER-TO-PEER (P2P) PERIPHERAL COMMUNICATION CONTROL

BACKGROUND

Traditionally, peripheral devices lack any Operating System (OS) and are completely controlled through firmware and device driver commands sent from the host to which the peripheral devices are connected. This means that the host completely controls the peripheral and the peripheral is primarily a "dumb" device.

More recently, peripheral devices include a limited OS making such peripheral devices more autonomous than what has been available in the industry. Still, most of these peripheral devices lack any network connectivity (or included an extremely limited independent network connectivity) and these peripherals generally do not support processing any customized applications beyond the applications packaged with the peripheral (even though these peripherals include a processor).

Because of the limited connectivity and difficulty in processing customized applications, these peripherals are more intelligent than their predecessors but are still only marginally "intelligent."

SUMMARY

In various embodiments, methods and a system for P2P peripheral communication control are presented.

According to an embodiment, a method for P2P peripheral communication control is presented. More particularly, a device is detected as being connected to a host. The device is instructed to reboot in an accessory mode or operation as a peripheral to the host. The peripheral is authenticated for interaction with the host. Finally, a secure communication session is established between the host and the peripheral with communications provided in a message passing formation as messages passed between the host and the peripheral and controlled by the host.

DETAILED DESCRIPTION

Figure 1A:
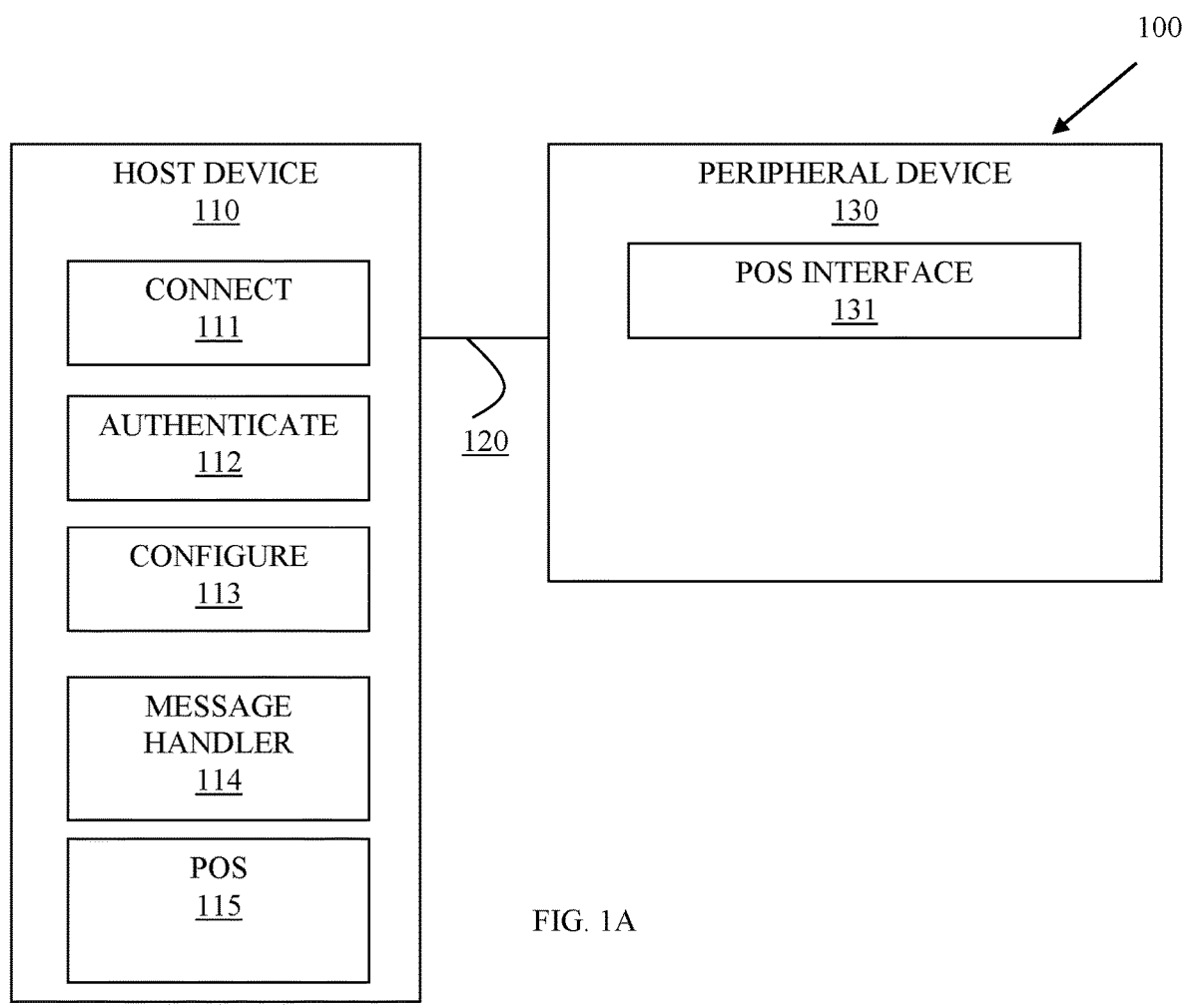
FIG. 1A is a diagram of a system for P2P peripheral communication control, according to an example embodiment.

FIG. 1A is a diagram of a system 100 for P2P peripheral communication control, according to an example embodiment. The various components are illustrated and the arrangement of the components is presented for purposes of illustration only. It is to be noted that other arrangements with more or less components are possible without departing from the P2P peripheral communication control teachings presented herein and below.

The techniques, methods, and system presented herein and below for P2P peripheral communication control can be implemented in whole or in part in one, all, or some combination of the components shown with the system 100. The techniques and methods are programmed as executable instructions in memory and/or non-transitory computer-readable storage media and processed on one or more processors associated with the various components.

As used herein the term "peripheral" may be used interchangeably and synonymously with the phrase "peripheral device."

Peripherals can include, by way of example only, a printer, a card reader, a touch screen display, a non-touch screen display, a bar code scanner, a weigh scale, a camera, a magnetic stripe card reader, a EMV (Europay®, Mastercard®, Visa®) embedded chip card reader, and the like.

The peripherals include a processor and a limited OS having no or restricted external network access capabilities.

As used herein, a "host" is a computer device having full network connectivity, an OS, memory, and storage.

The host is configured with a Point-Of-Sale (POS) application that executes on the processors of the host within the host's OS. The host is operated by a customer (such that the host is a Self-Service Terminal (SST) or can be operated by a clerk on behalf of a customer for a customer transaction. As used herein, an "operator" includes a customer and a clerk. Moreover, the term "operator" may be used synonymously and interchangeably with the term "user."

The system 100 includes a host 110 and a peripheral 120. The host includes software modules that execute on the host 110 including a connect module 111, an authentication module 112, a configuration module 113, a message handler module 114 and a POS module 115. The host 110 is connected to the peripheral 130 through a wired connection 120. The peripheral 130 includes a POS interface 131. Both the host 110 and the peripheral 130 include their own OS (not shown in the FIG. 1A).

The processing of the modules 111-115 and 131 are now discussed with reference to the FIG. 1B.

Figure 1B:
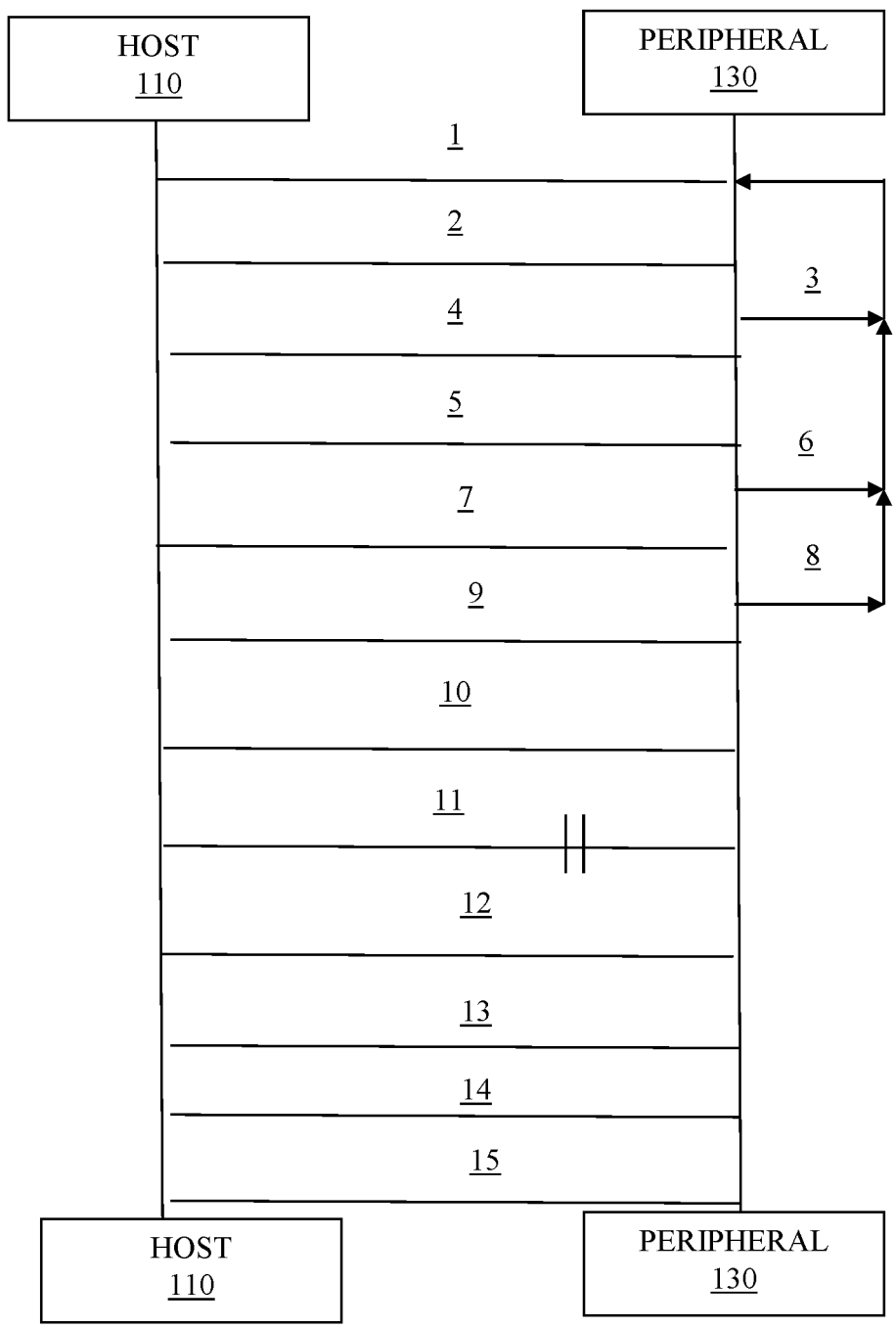
FIG. 1B is an interaction diagram for host and a peripheral to establish an authenticated communication session providing host control of the peripheral, according to an example embodiment.

The connect module 111 and the POS interface 131 interact when the wired connection 120 is established between the host 110 and the peripheral 130 to perform the processing illustrated as 1-9 in the FIG. 1B.

The authentication module 112 and the POS interface 131 perform the processing 10-12.

The configuration module 113 and the POS interface 131 perform the processing at 13.

The message handler module 114 and the POS interface 131 perform the processing at 14.

The POS module 115 and the POS interface 131 perform the processing at 15.

The processing depicted at 1-14 is now discussed with the above-noted modules 111-115 and 131 performing their above-designated processing. It is to be noted that more or less modules may be deployed without departing from the teachings presented herein. For example modules 111-113 may be a single module.

At 1, the host device 110 detects a connected peripheral 130 over a wired connection 120. In an embodiment, the wired connection 120 is a Universal Serial Bus (USB) connection. The can be done through traditional OS mechanisms that report the presence of a connected device 130 to the host 110.

At 2, the host 110 instructs the peripheral 130 to switch from device mode of operation to an accessory mode of operation. In response, the peripheral 130 reboots itself in an accessory mode of operation permitting control by the host 110.

At 3, the host 110 and the peripheral 130 open an initial communication session with one another with the peripheral 130 operating in an accessory mode of operation.

At 5, the host 110 verifies that the peripheral 130 is running a listed version of the POS interface 131 or a version that is compatible with the POS module 115.

When the version of the POS interface 131 necessitates an update to a newer version of the POS interface 131, the host 110 downloads the correct version from an external network connection accessible to the host 110 and dynamically pushes, at 5, the new version to the peripheral 130. In response, the peripheral 130 installs the new version and restarts, at 6, with the new version of the interface 131 and processing starts back at 1 when the peripheral 130 is finished restarting itself. Optionally, and in some instances the restart may necessitate a reboot of the device 130.

At 7, the host verifies that the peripheral 130 is running the latest available version of the OS. When the peripheral 130 is not running the latest version or a version compatible with the host 110, the host 110 downloads the correct version from an external network connection accessible to the host 110 and dynamically pushes, at 7, the new version to the peripheral 130. In response, the peripheral 130 saves the new version of the OS and reboots, at 8, with the new version of the OS and processing starts back at 1 when the peripheral 130 is finished rebooting itself.

At 9, a stable and open initial connection is achieved between the host 110 and the peripheral.

At 10, the host 110 and the peripheral 130 authenticated to one another. This can be done in a number of manners. For example, and in an embodiment, the peripheral 130 includes a prepackaged signed certificate and hashing algorithm that decrypts the certificate with a peripheral key and hashes the certificate to obtain a fingerprint (select string of characters obtained from the certificate). The fingerprint is decrypted with the certificate and provide to the host 110. The host decrypts the fingerprint with its signed certificate to obtain a first fingerprint. Next, the host 110 performs the same processing as was done on the peripheral 130 to obtain a second fingerprint. The first and second fingerprint are compared and if they match processing proceeds as an authenticated P2P connection, at 12, between the host 110 and the peripheral 130. However, if the fingerprints do not match, the host 110 disconnects the peripheral 130 at 11 (disconnection illustrated by the two vertical lines in the FIG. 1B).

At 12, the secure and authenticated P2P connection between the host 110 and the peripheral 130 is established.

At 13, the host 110 and the peripheral 130 exchange configuration information that permit the two to communicate with one another, such as device types, device names, device identifiers, message passing method used for communication, etc.

At 14, the host 110 and the peripheral both hook in, configure, and process a same published subscriber module message passing scheme customized for the POS module 114.

At 15, the message handler 114 and the POS module 115 cooperate for controlling message handling and messages sent from the POS interface 131 and to the POS interface 131 for processing during the now established secure P2P connection between the host 110 and the peripheral 130.

The messages provide instructions and/or information for the peripheral 130 and the host 110 to communicate with one another over the secure P2P connection.

In an embodiment, the messages are in JavaScript® Object Notation (JSON).

The messages are serialized and prioritized for processing by the message handler 114. Each message is identified as a different type of message, such as transaction commands, for a transaction being processed on the host 110 heartbeats, debugging/logging information. For example, debugging/logging is prioritized lower than transaction commands.

As one example of processing associated with the message passing during the secure P2P connection, consider that the peripheral 130 is a touchscreen display 130 operated by a customer, the host 110 is operated by a clerk for a transaction and there is at least one other connected P2P peripheral 130 connected to the host 110 in a separate, secure, and independent P2P connection with the host 110, such as a printer 130. During the transaction, the host 110 sends display commands to the touchscreen 130 as messages that the touchscreen 130 presents information relevant to the transaction. One command displays a print receipt option on the touchscreen 130. The touchscreen 130 (responsive to a customer touch on the receipt option) sends a message back to the host 110 to print the receipt, the host 110 sends the print command and print data (receipt data) to the printer 130 over the separate P2P connection between the host 110 and the printer 130; in response, the printer 130 prints the receipt data.

This example illustrates that the host 110 can have multiple independent peripherals 130, with each separate peripheral 130 having its own independent secure P2P connection to the host 110. The peripherals 130 can interact through the host. Communication is achieved through the messaging passing with control maintained by the host 110.

The host 110 can filter messages received based on the peripheral that is to receive a message, prioritize the messages for sending during a transaction, and send or provide messages from to the POS module 115 for transaction processing.

In an embodiment, the host 110 and the peripheral 130 include an Android® OS and utilize the Android® Open Accessory Application Programming Interface (API) over a USB wired connection to perform the processing discussed above.

In an embodiment, the host 110 is a tablet computer and the peripheral 130 is also a tablet computer. In an embodiment, the size of the display on the host is larger than the size of the display on the peripheral 130. In an embodiment, the host 110 and the peripheral 130 are encased in single housing with one another. In an embodiment, the host 110 also includes additional P2P connected peripherals 130 that include a camera, and one or more of a Near Field Communication (NFC) device, an EMV card reader, and a Magnetic Stripe Reader. In an embodiment, the system 100 is a POS terminal. In an embodiment, the system 100 is a SST.

These embodiments and other embodiments are now discussed with reference to the FIGS. 2-4.

Figure 2:
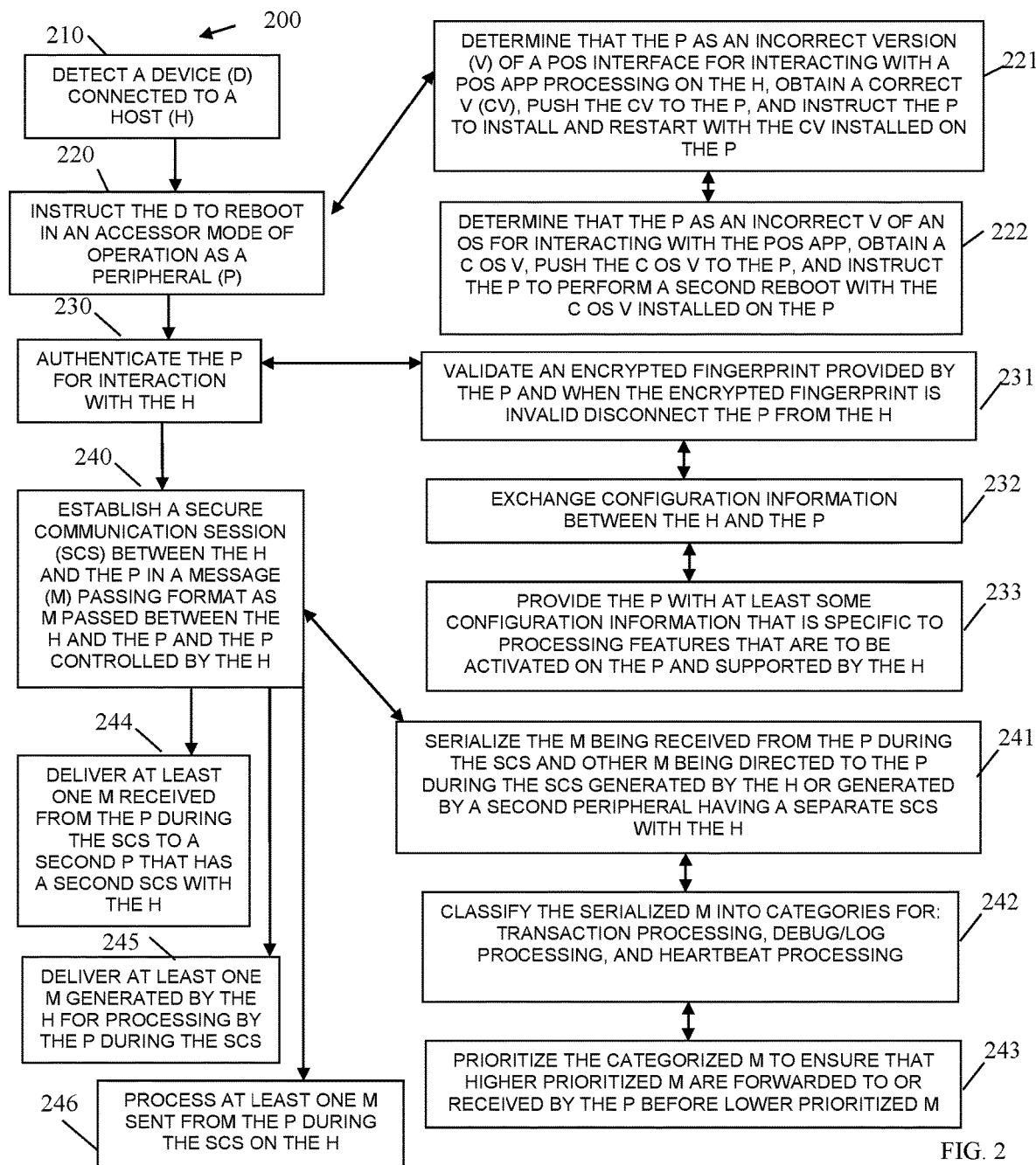
FIG. 2 is a diagram of a method for P2P peripheral communication control, according to an example embodiment.

FIG. 2 is a diagram of a method 200 for P2P peripheral communication control, according to an example embodiment. The software module(s) that implements the method 200 is referred to as a "host peripheral connection manager." The host peripheral connection manager is implemented as executable instructions programmed and residing within memory and/or a non-transitory computer-readable (processor-readable) storage medium and executed by one or more processors of a device. The processor(s) of the device that executes the host peripheral connection manager are specifically configured and programmed to process the host peripheral connection manager. The host peripheral connection manager has access to one or more networks during its processing. The networks can be wired, wireless, or a combination of wired and wireless.

In an embodiment, the host peripheral connection manager implements the processing for all of or some combination of the modules 111-115.

In an embodiment, the device that executes the host peripheral connection manager is the host 110.

In an embodiment, the device that executes the host peripheral connection manager is tablet computer.

In an embodiment, the device that executes the host peripheral connection manager is a POS terminal. In an embodiment, the POS terminal is a SST.

At 210, the host peripheral connection manager detects a device connected to the host. In an embodiment, this is a wired connection. In an embodiment, this is a USB connection.

At 220, the host peripheral connection manager instructs the device to reboot in an accessory mode of operation as a peripheral device. In an embodiment, once the device is rebooted in an accessory mode of operation, the device becomes a peripheral device to the host.

In an embodiment, at 221, the host peripheral connection manager determines that the peripheral has an incorrect version of a POS interface for interacting with a POS application processing on the host. In response, the host peripheral connection manager: obtains through a network connection available to the host a correct version of the POS interface, dynamically pushes the correct version of the POS interface over the wired connection to the peripheral, and instructs the peripheral to install and restart with the correct version of the POS interface installed on the peripheral.

In an embodiment of 221 and at 222, the host peripheral connection manager determines that the peripheral has an incorrect version of an OS for interacting with the POS application. In response, the host peripheral connection manager obtains the correct version of the OS through the network connection, dynamically pushes the correct version of the OS to the peripheral, and instructs the peripheral to install and reboot with the correct version of the OS interface on the peripheral.

At 230, the host peripheral connection manager authenticates the peripheral for interaction with the host.

In an embodiment, at 231, the host peripheral connection manager validates an encrypted fingerprint provided by the peripheral and when the encrypted fingerprint is invalid, the host peripheral connection manager disconnects the peripheral from the host.

In an embodiment of 231 and at 232, the host peripheral connection manager exchanges configuration information between the host and the peripheral.

In an embodiment of 232 and at 233, the host peripheral connection manager provides the peripheral with at least some configuration information that is specific to processing features that are to be activated on the peripheral and supported by a POS application processing on the host.

At 240, the host peripheral connection manager establishes a secure communication session between the host and the peripheral in a message passing format as messages are passed between the host and the peripheral during the secure communication session.

In an embodiment, at 241, the host peripheral connection manager serializes the messages received from the peripheral during the secure communication session and serializes other messages being directed to the peripheral during the secure communication session that are generated by the host or generated by a second peripheral that has a separate and independent secure communication session with the host.

In an embodiment of 241 and at 242, the host peripheral connection manager classifies the serialized messages into categories for: transaction processing, debug/log processing, and heartbeat processing.

In an embodiment of 242 and at 243, the host peripheral connection manager prioritizes the categorized messages to ensure that the higher prioritized messages are forwarded to or received by the peripheral before lower prioritized messages.

In an embodiment of 240 and at 244, the host peripheral connection manager delivers at least one message that is received from the peripheral during the secure communication session to a second peripheral that has a second and independent secure communication session with the host.

In an embodiment of 240 and at 245, the host peripheral connection manager delivers at least one message generated by the host for processing by the peripheral during the secure communication session.

In an embodiment of 240 and at 246, the host peripheral connection manager processes at least one message sent from the peripheral during the secure communication session on the host.

Figure 3:
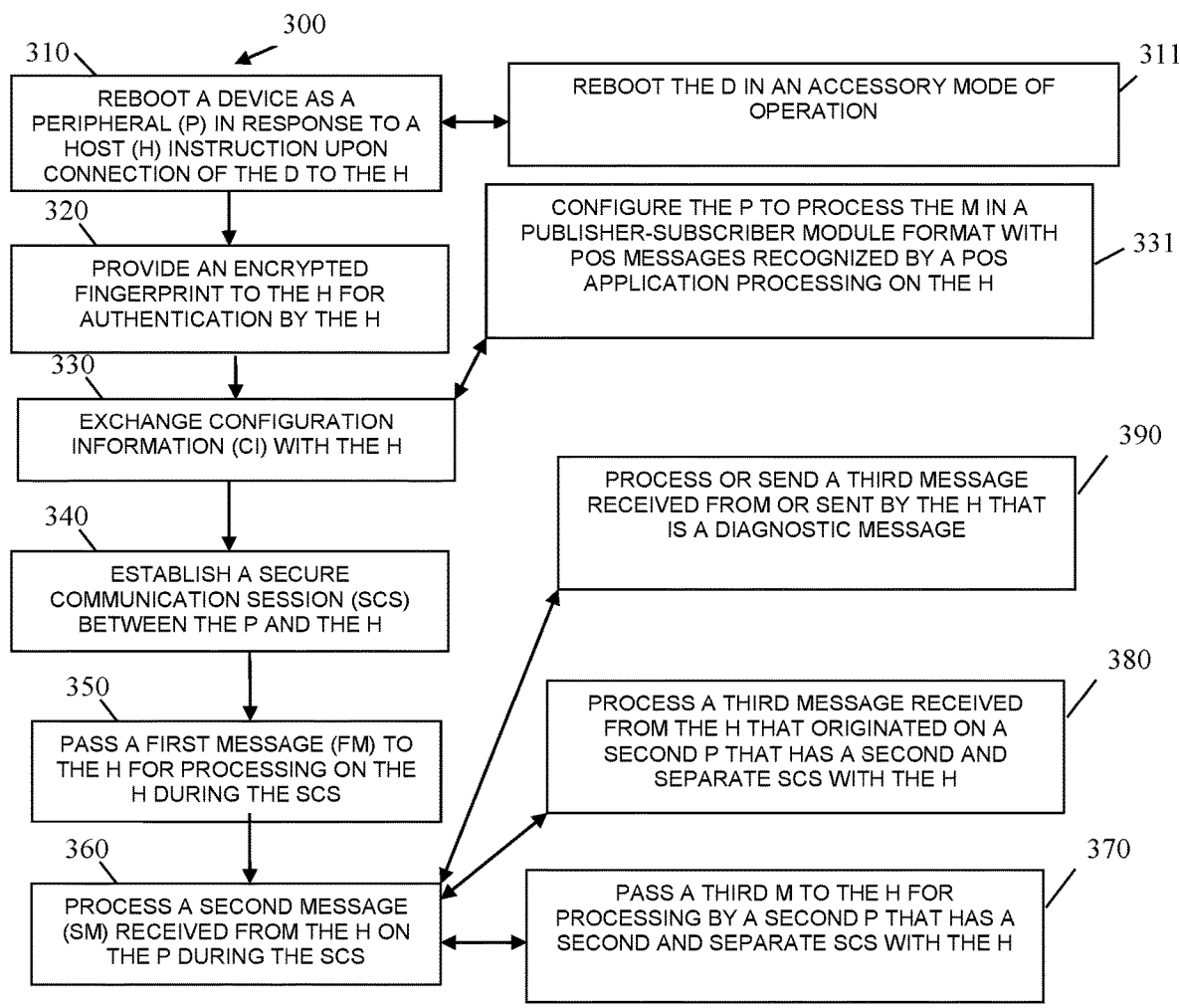
FIG. 3 is a diagram of another method for P2P peripheral communication control, according to an example embodiment.

FIG. 3 is a diagram of another method 300 for P2P peripheral communication control, according to an example embodiment. The software module(s) that implement the method 300 is referred to herein as a "peripheral connection manager." The peripheral connection manager is implemented as executable instructions and programmed within memory and/or a non-transitory computer-readable (processor-readable) storage medium that executes on one or more processors of a device. The processors of the device are specifically configured to execute peripheral connection manager.

In an embodiment, the peripheral connection manager does not have access to any external network. The peripheral connection manager lacks communication capabilities over a network connection.

The processing described herein for the peripheral connection manager provides processing associated with the P2P peripheral connection and communication from the perspective of the peripheral.

In an embodiment, the v peripheral connection manager is all of some combination of the processing discussed above with respect to the POS interface 131.

In an embodiment, the device that executes the peripheral connection manager is the peripheral 130.

In an embodiment, the device that executes the peripheral connection manager is a tablet computer.

In an embodiment, the device that executes the peripheral connection manager is one of: a MSR card reader, an EMV card reader, a keyboard, a touchscreen display, a printer, a barcode scanner, a camera, a weigh scale, a currency dispenser, a change dispenser, etc.

At 310, the peripheral connection manager reboots the device (the device executing the peripheral connection manager) as a peripheral upon connection of the device to the host. This makes the device operate as a peripheral that is controlled by the host. In an embodiment, the peripheral lacks network connectivity to any external network.

According to an embodiment, the peripheral connection manager reboots the device in an accessory mode of operation.

At 320, the peripheral connection manager provides an encrypted fingerprint to the host for authentication of the peripheral to the host.

At 330, the peripheral connection manager exchanges configuration information with the host.

In an embodiment, at 331, the peripheral connection manager configures the peripheral to process messages in a publisher-subscriber module format with POS messages recognized by a POS application processing on the host.

At 340, the peripheral connection manager establishes a secure c communication session between the peripheral and the host.

At 350, the peripheral connection manager passes a first message to the host for processing by the host during the secure communication session.

At 360, the peripheral connection manager processes a second message received from the host on the peripheral during the secure communication session.

According to an embodiment, at 370, the peripheral connection manager passes a third message to the host for processing by a second peripheral that has a second and separate P2P secure communication session with the host during the secure communication session (which is also a P2P connection to the host).

In an embodiment, at 380, the peripheral connection manager processes a third message received from the host that originated on a second peripheral that has a second and separate P2P secure communication session with the host during the secure communication session (which is also a P2P connection to the host).

In an embodiment, at 390, the peripheral connection manager processes or sends a third message received from or sent by the host that is a diagnostic message (debug, log, heartbeat, etc).

Figure 4:
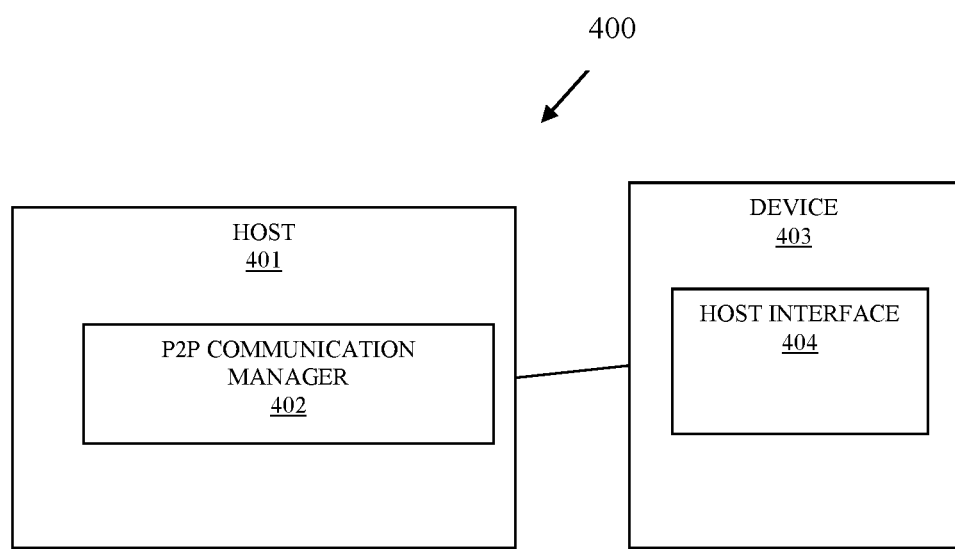
FIG. 4 is a diagram of another system for P2P peripheral communication control, according to an example embodiment.

FIG. 4 is a diagram of a system 400 for or P2P peripheral communication control, according to an example embodiment. The components of the system 400 are programmed and reside within memory and/or a non-transitory computer-readable medium and execute on one or more processors of multiple devices of the system 400. One device of the system 400 also has access and can communicate over one or more networks; and the networks can be wired, wireless, or a combination of wired and wireless. In an embodiment, one device of the system lacks a network connection or any ability to communicate over an external network.

The system 400 is configured and programmed to perform the processing discussed above with the FIGS. 1A-1B and 2-3.

The system 400 includes a host 401 having a P2P communication manager 402, and the system 400 includes a device 403 having a host interface 404.

In an embodiment, the host 401 is the host 110.

In an embodiment, the P2P communication manager 402 some combination of or all of the processing discussed above with modules 111-115 and the method 200.

In an embodiment, the host 401 is a tablet computer.

In an embodiment, the host 401 is a POS terminal. In an embodiment, the POS terminal is a SST.

In an embodiment, the device 403 is the peripheral 130.

In an embodiment, the host interface 404 performs all or some combination of the processing discussed above for module 131 and the method 300.

In an embodiment, the device 403 is a tablet computer.

In an embodiment, the device 403 is one of: a MSR card reader, an EMV card reader, a keyboard, a touchscreen display, a printer, a barcode scanner, a camera, a weigh scale, a currency dispenser, a change dispenser, etc.

In an embodiment, the host 401 and the device 403 are enclosed in a single and same housing.

In an embodiment, the host 401 is a first tablet computer, and the device 403 is a second tablet computer.

The P2P communication manager 402 is configured to: i) execute on at least one processor of the host 401, ii). instruct the device 403 to reboot as a peripheral upon detection of the device 403 through a wired connection to the host 401, iii) establish a secure communication session with the device 403 as the peripheral: iv) control the peripheral during the secure communication session through messages passed during the secure communication session.

The host interface 404 is configured to: i) execute on at least one processor of the device 403, ii) reboot the device 403 to operate in an accessory mode of operation as the peripheral, iii) process some of the messages on the device 403 received from the host 401 during the secure communication session, and iv) send other of the messages to the host 401 for further processing by the host 401 or a second peripheral during the secure communication session.

In an embodiment, the wired connection is a USB connection.

In an embodiment, the device 403 lacks a network connection when rebooted as the peripheral.

It should be appreciated that where software is described in a particular form (such as a component or module) this is merely to aid understanding and is not intended to limit how software that implements those functions may be architected or structured. For example, modules may be illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors of a single device, or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
providing executable instructions to a processor of a device from a non-transitory computer-readable storage medium causing the processor to of the device to perform operations comprising:
operating the device in a first mode of operation without a connection to a host device;
determining that a wired connection was made between the device and the host device;
receiving over the wired connection a host instruction from the host device requesting that the device switch from the first mode of operation to an accessory mode of operation while connected over the wired connection to the host device;

rebooting the device for operation in the accessory mode of operation as a peripheral to the host device based on the host instruction;

after rebooting to the accessory mode of operation, decrypting a certificate stored on the device with a peripheral key stored on the device and providing a select string of characters that were decrypted as a device fingerprint to the host device for an authentication by the host device;

exchanging configuration information with the host device after the authentication;

establishing a secure communication session between the peripheral and the host device based on the configuration information;

passing a first message to the host device for processing on the host device during the secure communication session while the device is operating as the peripheral to the host device in the accessory mode of operation; and processing a second message received from the host device on the device as the peripheral to the host device during the secure communication session.

2. The method of claim 1, wherein exchanging further includes configuring the device acting as the peripheral of the host device to process the messages in a publisher-subscriber model format with Point-Of-Sale (POS) messages recognized by a POS application processing on the host.

3. The method of claim 1 further comprising, passing a third message to the host device for delivery by the host device to a second peripheral that has a second and separate secure communication session with the host device, wherein the second peripheral processes the third message.

4. The method of claim 1 further comprising, receiving a third message from the host device that originated on a second peripheral that has a second and separate secure communication session with the host device and processing the third message on the device as the peripheral to the host device.

5. The method of claim 1 further comprising, processing or sending a third message received from or sent by the host device that is a diagnostic message.

* * * * *